United States Patent [19]

Fujioka et al.

[11] Patent Number: 4,480,492
[45] Date of Patent: Nov. 6, 1984

[54] LUBRICATION CONDUIT IN A PINION GEAR CARRIAGE FOR AUTOMATIC TRANSMISSION

[75] Inventors: Kazuyoshi Fujioka, Tokyo; Shinsuke Eguchi, Yokohama, both of Japan

[73] Assignee: Nissan Motor Company, Limited, Yokohama, Japan

[21] Appl. No.: 329,809

[22] Filed: Dec. 11, 1981

[30] Foreign Application Priority Data

Dec. 19, 1980 [JP] Japan .......................... 55-181785[U]
Dec. 19, 1980 [JP] Japan .......................... 55-181786[U]

[51] Int. Cl.³ .................. F16H 3/44; F16H 57/04; F01M 9/00; F16C 1/24
[52] U.S. Cl. .................. 74/467; 74/750 R; 184/6.12
[58] Field of Search .............. 74/750 R, 467, 468, 74/674, 793; 184/11 B, 6.12; 308/187

[56] References Cited

U.S. PATENT DOCUMENTS

| | | | |
|---|---|---|---|
| 2,408,336 | 9/1946 | Orr | 184/6.12 |
| 2,687,928 | 8/1954 | Russey | 308/187 |
| 3,053,115 | 9/1962 | Cartwright | 184/6.12 X |
| 3,497,277 | 2/1970 | Malott | 308/187 |
| 3,722,300 | 3/1973 | Crooks | 74/705 X |
| 4,114,478 | 9/1978 | Claus | 74/750 R X |

Primary Examiner—Allan D. Herrmann
Assistant Examiner—Stephen B. Andrews
Attorney, Agent, or Firm—Schwartz, Jeffery, Schwaab, Mack, Blumenthal & Koch

[57] ABSTRACT

A pinion gear support carriage for a planetary gear arrangement in an automatic transmission includes a first lubrication conduit leading radially from a sun gear to the needle bearings of a plurality of pinion gear shafts. Pair of thrust washers between the pinion gear and the carriage frame have cut-outs at their centers that overlap to create subsidiary lubrication conduits between the first lubrication conduit and the needle bearings.

4 Claims, 13 Drawing Figures

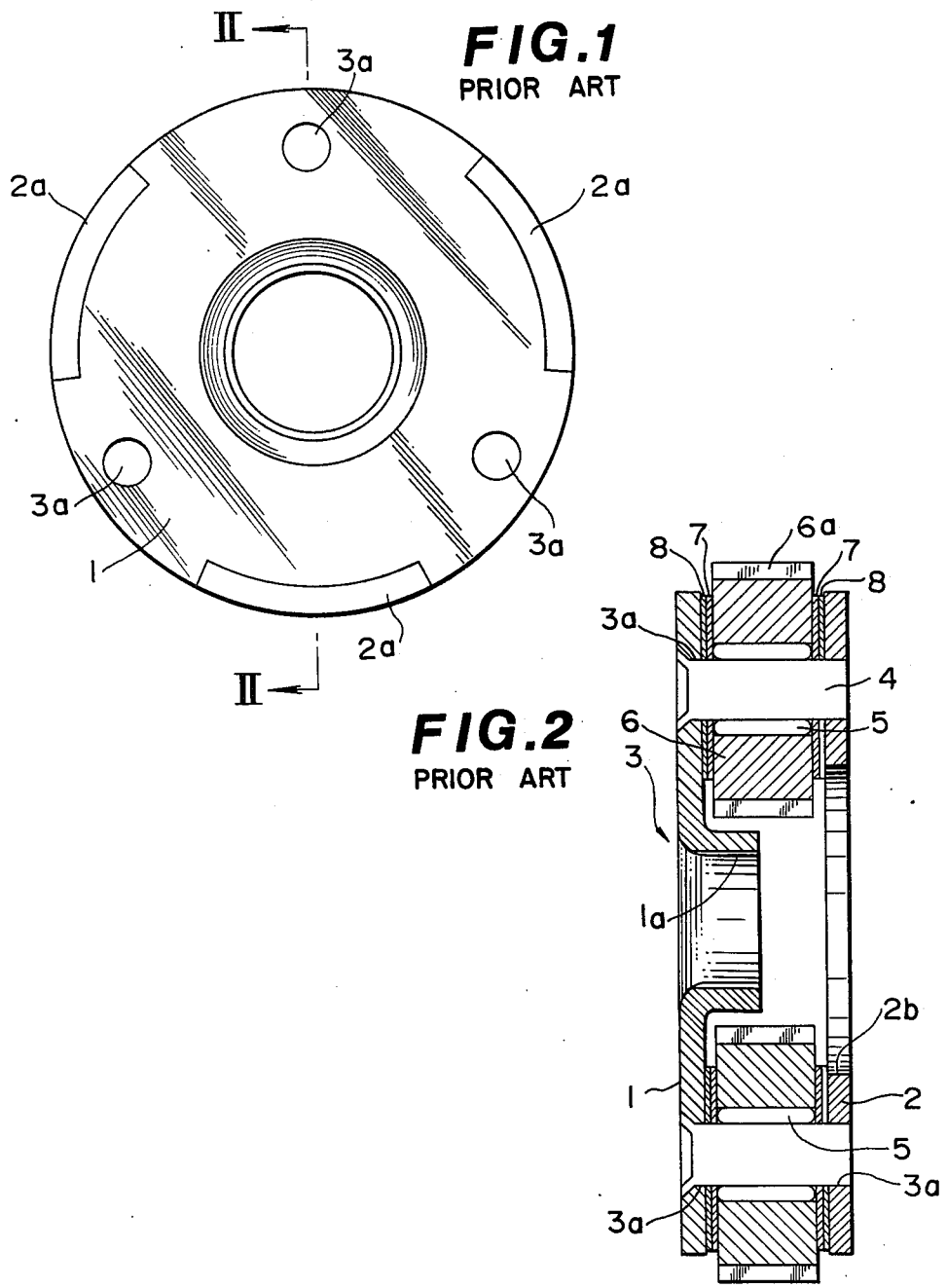

4,480,492

LUBRICATION CONDUIT IN A PINION GEAR CARRIAGE FOR AUTOMATIC TRANSMISSION

BACKGROUND OF THE INVENTION

1. Field of the Invention

The invention relates to a pinion gear carriage in a planetary gear mechanism for use in an automatic transmission, and in particular to the frame, bearing and washer structures for a pinion gear carriage in which no separate lubricating device is employed.

2. Description of the Prior Art

A planetary gear mechanism, such as is commonly used in automatic transmissions, comprises a sun gear, at least one planet gear, and a plurality of pinion gears for transmitting rotation from the sun gear to the planet gear. The pinion gears are rotatably supported within a carriage which rotates with the sun gear.

The pinion gear carriage includes a plurality of fixed, radially-symmetrically-arranged shafts, one for each pinion gear running between two opposing member of the carriage. Each shaft is provided with a bearing, such as a needle bearing to ease rotation of the pinion gears about the shafts. In addition, thrust washers are installed on either side of the pinion gears between the gears and the walls of the carriage to prevent frictional contact therebetween. Normally, two or more washers are used on each side so as to limit the gradient of rotational speed across each washer.

The frame of the carriage itself usually consists of a pair of parallel, concentric, annular disks welded together or formed integrally. Within the space between the disks, the sun gear will engage the innermost teeth of the pinion gears. In addition, the carriage frame includes a means for engaging with a central shaft which rotates coaxially with the sun gear. The central shaft and the sun gear are connected via a differential mechanism so as to rotate together, but at different speeds. Thus, as the sun gear rotates, the pinion gears will rotate at a rate proportional to the difference in speed between the sun gear and the central shaft, and transmit this rotation to the planet gears.

It is necessary to provide lubrication for the needle bearings of the pinion gears. Prior art carriages have employed separate lubrication devices for each bearing. This design necessarily increases the cost of manufacture and adds a plurality of elements of imperfect reliability. Considering the difficulty and therefore cost of automatic transmission repair, any increase in reliability will significantly improve user convenience.

SUMMARY OF THE INVENTION

With these considerations in mind, the pinion gear carriage of the present invention provides for lubrication of the needle bearings using excess lubricant spun off from the sun gear. Such lubricant, propelled by the rotation of the sun gear, is conducted by a specially machined lubrication conduit wall to the pinion gear shafts, and is then conducted throughout the needle bearings via subsidiary lubrication conduits formed between the shafts and the central circumferences of the thrust washers.

This method of supplying lubricant to the needle bearings will eliminate the need for separate lubrication devices, thereby increasing transmission reliability and decreasing the cost of manufacture of the carriage.

In addition, there is disclosed a pinion gear carriage in which the lubrication conduit wall can be formed by press-machining. This will permit fabrication of the carriage solely through press-machining steps, which will increase productivity and therefore reduce manufacturing costs.

Toward these ends, novel designs for the pinion gear carriage frame and the thrust washers are disclosed. It is taught herein that the inner circumference of one of the annular disk members of the frame should be shaped to form a lubrication conduit wall and positioned to intercept excess lubricant spinning off from the sun gear and direct it to the shafts of the pinion gears. It is further taught that the thrust washers should have an inner diameter greater than the diameter of the shafts across at least part of their inner circumference in order to form subsidiary lubrication conduits between the lubrication conduit wall and the needle bearings. Alternatives shapes of the lubrication conduit wall and the thrust washer are illustrated by way of example.

BRIEF DESCRIPTION OF THE DRAWINGS

The embodiments of the pinion gear carriage of the present invention will be described with reference to the appended drawings, in which like reference numerals denote like elements, and in which:

FIG. 1 is a plan view of a prior art pinion gear carriage;

FIG. 2 is a side view in cross-section along the line II—II in FIG. 1 of a prior art pinion gear carriage;

DESCRIPTION OF THE PREFERRED EMBODIMENTS

Figure 3:
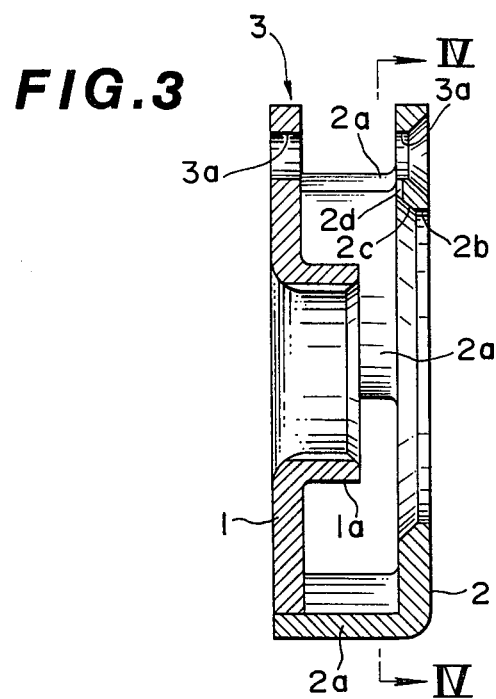
FIG. 3 is a side view in cross-section of a first embodiment of a pinion gear carriage according to the present invention.

In order to clearly illustrate the features and advantages of the present invention, a prior art pinion gear carriage will be described in detail with reference to FIGS. 1 and 2.

The frame of a pinion gear carriage is usually made up of two roughly annular members 1 and 2. The first annular member 1 includes a plurality of splines 1a at its center which act as a means for engaging the carriage frame fixedly to a central shaft (not shown) in order to rotate therewith. The second annular member 2 has a central aperture 2b of a diameter greater than that of the central shaft. The second member 2 also has a number of tabs 2a (shown in FIG. 3) spaced roughly symmetrically about its circumference and projecting out of the plane of the second member 2. Of course, the tabs 2a can be provided on either of the annular members 1 or 2. The two annular members 1 and 2 are welded together at the free ends of the tabs 2a to form a carriage frame 3. The annular members 1 and 2 now constitute walls of the carriage frame 3, and the space therebetween constitutes the interior of the carriage frame.

A plurality of holes 3a are drilled through both of the walls 1 and 2 of the carriage frame 3. The holes 3a are positioned so as to be radially-symmetrically arranged about the center of the carriage frame 3 and spaced from the center such that teeth 6a of pinion gears 6 (as will be described later) extend over the circumference of the walls 1 and 2 but not into the center of the carriage frame 3. A fixed pinion gear shaft 4 is press-fitted into each of the holes 3a so as to bridge the interior of the carriage frame 3. Each shaft 4 is provided with a needle bearing 5 and pinion gear 6. The pinion gears 6 are free to rotate about the shafts 4, and the needle bearings 5 reduce friction therebetween. In addition, a pair of thrust washers 7 and 8 is provided on each shaft 4 on both sides of each pinion gear 6. The thrust washers 7 and 8 serve to limit friction between the pinion gears 6 and the walls 1 and 2 and to fill any gaps therebetween in order to prevent lateral play in the pinion gears 6.

As can be seen in FIG. 2, such a pinion gear carriage provides very limited access of lubricant to the needle bearings 5; mechanical tolerances between the walls 1 and 2, the thrust washers 7 and 8, and the pinion gear 6 will by necessity be small compared to the space required for fluid flow of a heavy lubricant oil, such as is commonly employed in automatic transmissions. Thus, separate means for lubricating the needle bearing 5 must be provided for each pinion gear 6.

This need for separate lubricating devices can be eliminated by employing a pinion gear carriage structure such as that shown in FIGS. 3-5 and described hereinbelow.

Figure 4:
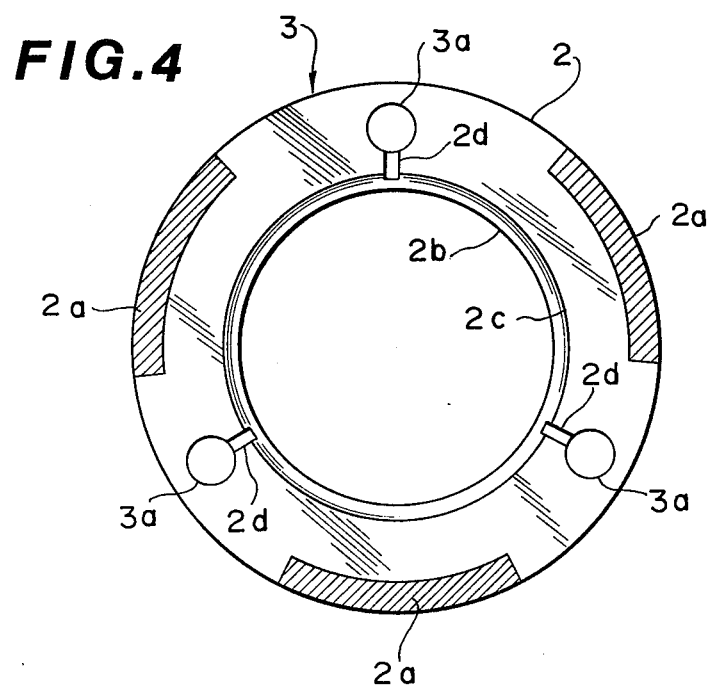
FIG. 4 is a plan view of the pinion gear carriage of FIG. 3, taken in cross-section along the line IV—IV of FIG. 3.
Figure 5:
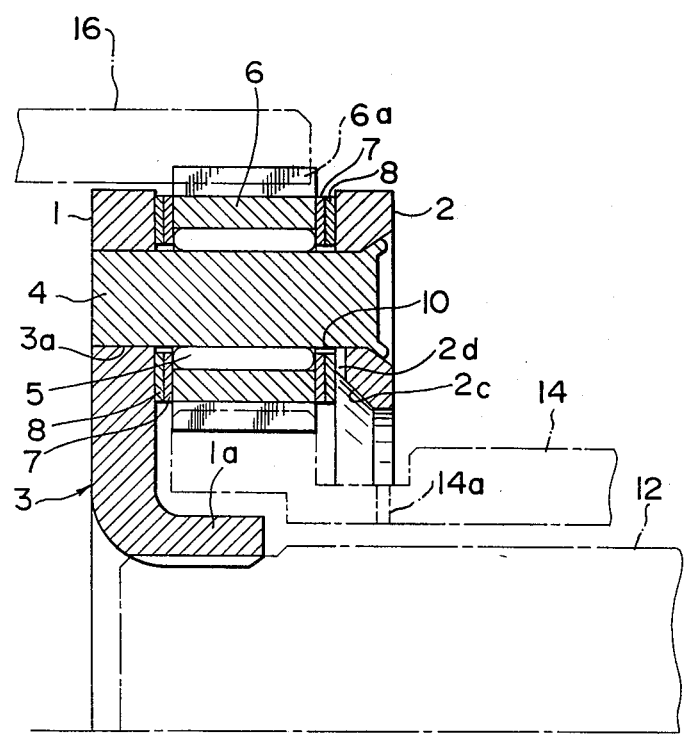
FIG. 5 is an enlarged side view in cross-section of half of the pinion gear carriage of FIG. 3 showing engagement with a sun gear and a central shaft.

FIGS. 3-5 illustrate a first preferred embodiment of the pinion gear carriage of the present invention. The frame 3 (shown in FIG. 3) of the pinion gear carriage is identical to the prior art frame except between the inner circumference 2b and the holes 3a of the second annular member 2. The inner circumference 2b is beveled on the interior side so as to form a sloped surface 2c leading from the center of the carriage frame 3 toward the shaft 4 the location of where a pinion gear is to be journaled. Between the sloped surface 2c and the holes 3a is a slot 2d recessed slightly with respect to the rest of the interior wall of the second annular member 2. The sloped surface 2c and the slot 2d comprise a lubrication conduit wall leading from the center of the carriage frame 3 to the shafts 4.

In addition, as illustrated in FIG. 5 the thrust washers 7 and 8 may be formed with central apertures of diameter greater than that of the shafts 4. The gap thus formed between the inner circumference of the washers 7 and 8 and the shaft 4 comprises a subsidiary lubrication conduit 10 (shown in FIG. 5) leading from the slot 2d to the needle bearing 5.

The operation of the first embodiment will be explained with reference solely to FIG. 5. The splines 1a of the carriage frame 3 engage with a central shaft 12 so as to be rotatable therewith. The central shaft 12 is also engaged with a sun gear 14 via a differential mechanism (not shown) so that the sun gear 14 rotates with the central shaft 12 but at a different speed, and the carriage frame 3 rotates synchronously with the central shaft 12, the central shaft 12, sun gear 14, and carriage frame 3 being coaxial. Thus, the rotational speed differential between the sun gear 14 and the carriage frame 3 is imparted to the pinion gears 6, which in turn impart rotational energy to a ring gear 16 engaged therewith.

The sun gear 14 has an orifice 14a at a position directly inward radially of the second annular member 2. As the sun gear 14 rotates, lubricant from within the space between the central shaft 12 and the sun gear 14 is ejected through the orifice 14a. Some of this lubricant is caught by the sloping surface 2c and runs into the slot 2d, the subsidiary lubrication conduit 10, and finally the needle bearing 5 due to rotational momentum. The lubricant will, of course, then be evenly distributed throughout the needle bearing 5 during normal operation.

It should be apparent from the foregoing discussion that it would not be necessary to provide means for lubrication beyond those already detailed. In addition, those of skill in the art will recognize that lubricant pressure at the needle bearings 5 will increase as the rotational speed of the pinion gears 6 increases.

Figure 6:
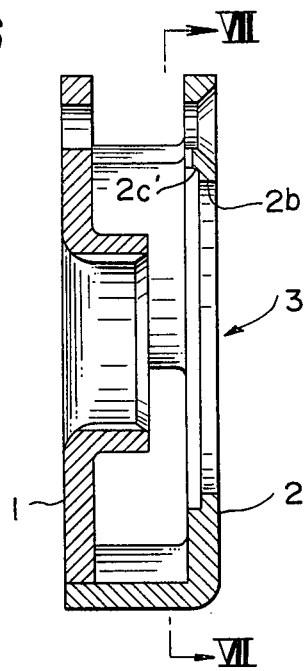
FIG. 6 is a side view in cross-section of a second embodiment of a pinion gear carriage according to the present invention.
Figure 7:
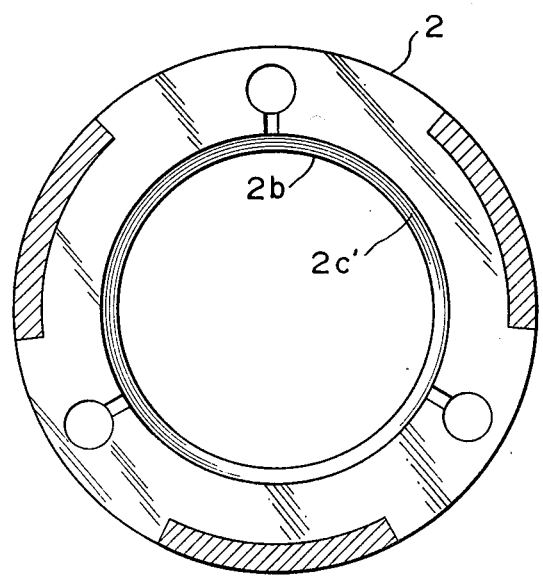
FIG. 7 is a plan view of the pinion gear carriage of FIG. 6, taken in cross-section along the line VII—VII of FIG. 6.
Figure 8:
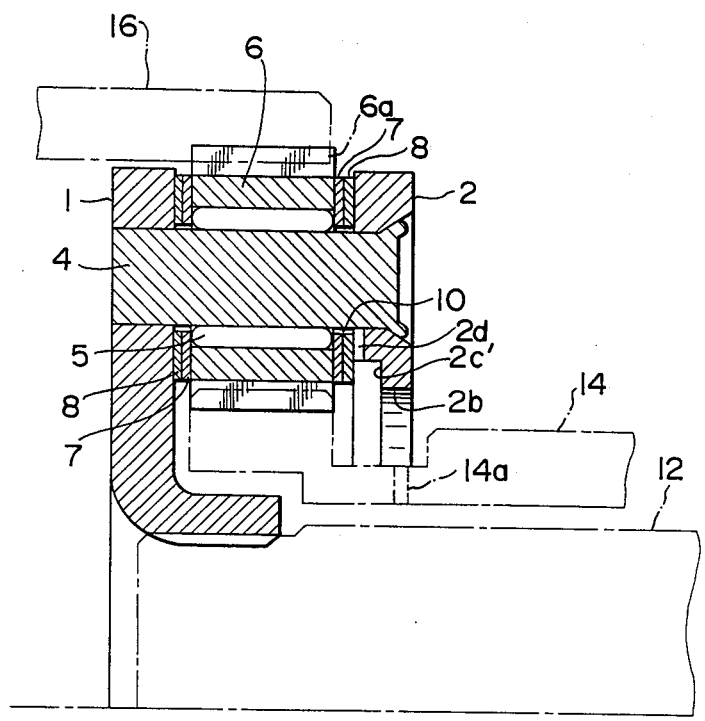
FIG. 8 is a view, similar to FIG. 5 of the pinion gear carriage of FIG. 6.
Figure 9:
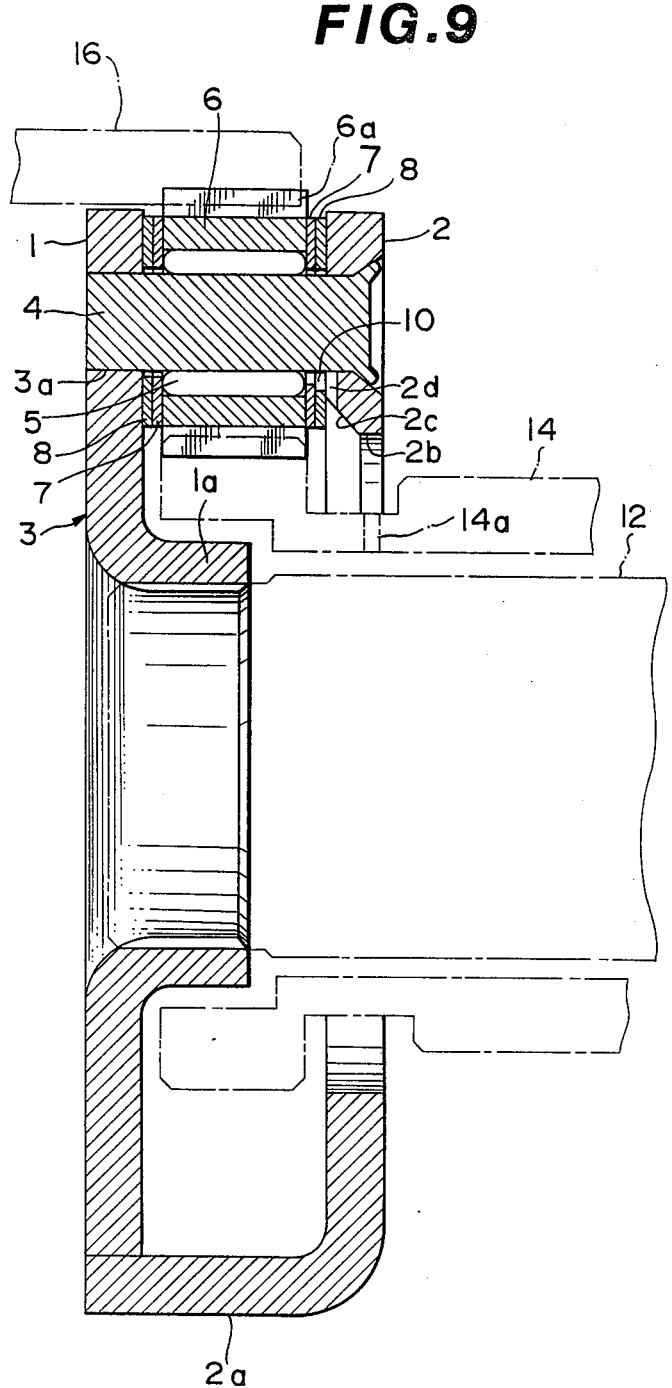
FIG. 9 is a side view in cross-section of a third embodiment of the pinion gear carriage according to the present invention, showing engagement with the sun gear and the central shaft.

The second preferred embodiment of the pinion gear carriage is illustrated in FIGS. 6-8. This embodiment is identical to the previous embodiment, except that a step 2c' replaces the sloped surface 2c as part of the lubrication conduit wall. The operation of this embodiment is substantially the same as that of the first embodiment.

The third preferred embodiment of the pinion gear carriage is illustrated in FIGS. 9-13. The third preferred embodiment is identical to the first, except for the shape of the thrust washers 7 and 8. As opposed to the first embodiment, the inner diameter of the thrust washers of the third embodiment is greater than the diameter of the shafts 4 along only part of the inner circumference thereof. The radial extent of the increased-diameter cut-outs is designed to ensure some overlap of the increase-diameter cut-outs between the thrust washers 7 and 8 of each pair of thrust washers.

Figure 10:
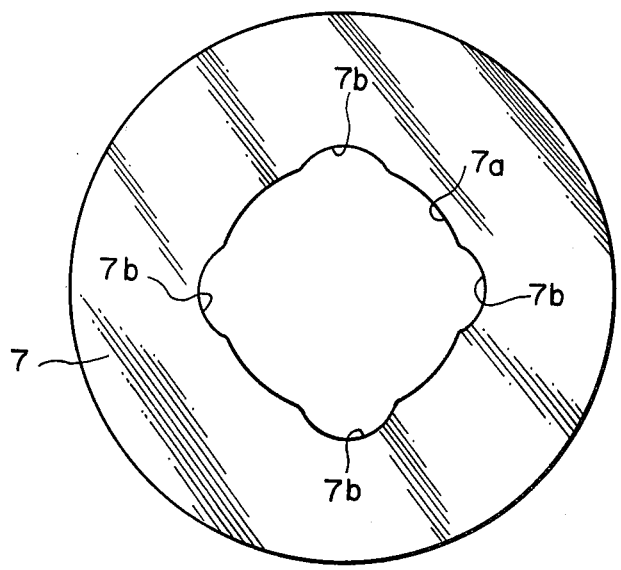
FIG. 10 is a plan view of a first thrust washer of the pinion gear carriage of FIG. 9.
Figure 11:
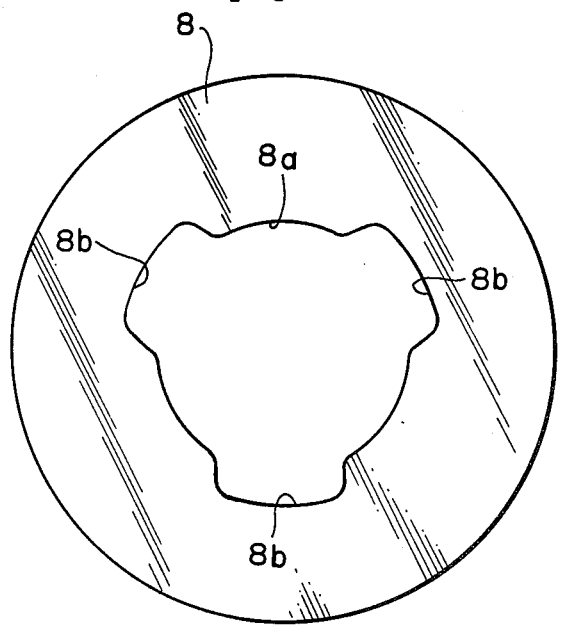
FIG. 11 is a plan view of a second thrust washer of the pinion gear carriage of FIG. 9.

Specifically, each inner thrust washer 7 has four cut-out portions 7b spaced equally about its inner circumference 7a as shown in FIG. 10. The diameter of the inner circumference 7a can be substantially the same as that of the shafts 4. Likewise, the inner diameter 8a of the outer thrust washers 8 can closely match that of the shafts 4. The outer thrust washers 8 are provided with three radially-symmetrically cut-out portions 8b, as shown in FIG. 11.

Figure 12:
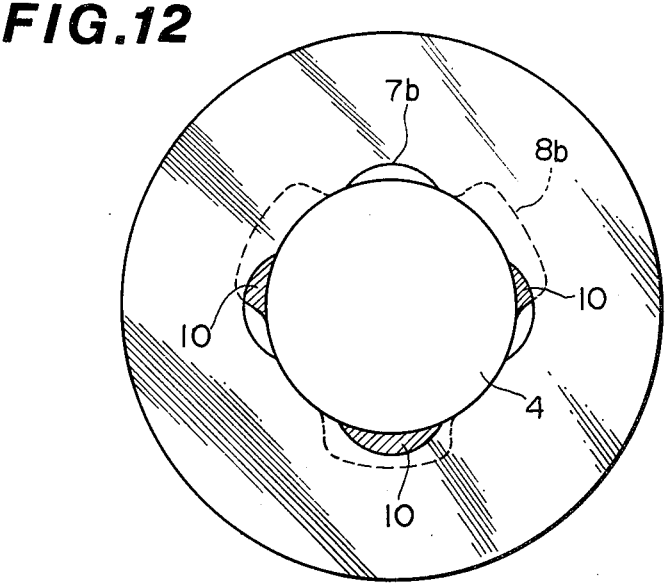
FIG. 12 is a plan view of one angular juxtaposition of the thrust washers of FIGS. 10 and 11.
Figure 13:
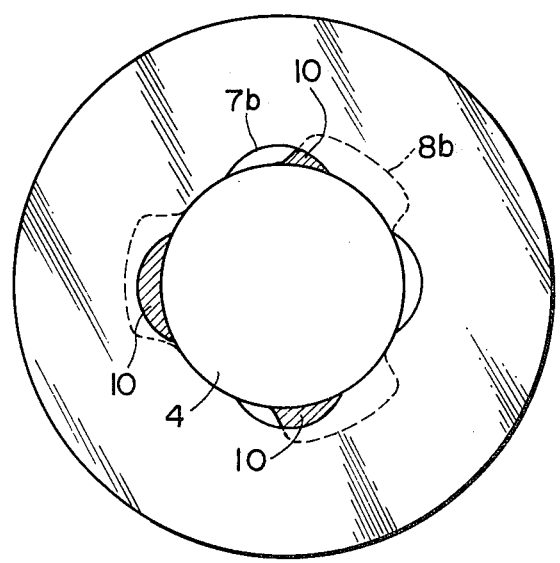
FIG. 13 is a plan view of another angular juxtaposition of the thrust washers of FIGS. 10 and 11.

The cut-out portions 7b and 8b are dimensioned wide enough that there will always be some overlap between the cut-out portions 7b and 8b as one of the thrust washers rotates with respect to the other, as shown in FIGS. 12 and 13. This overlap constitutes the subsidiary lubrication conduit 10 between the slot 2c and the needle bearing 5. In the case shown in FIGS. 10 and 11, each cut-out portion 7b covers about 40° of the inner circumference 7a, and each cut-out portion 8b about 60° in order to ensure overlap therebetween.

Of course, there are many combinations and designs for the cut-out portions 7b and 8b that can fulfill the requirement of ensured overlap and that will occur to the person of skill in the art. It is also possible for the inner diameters 7a and 8a to be greater than that of the shafts 4. In such a case, however, the thrust washers 7 and 8 will tend to become misaligned with respect to the shaft 4, and the resulting eccentric rotation will cause undue wear on the washers 7 and 8, the walls 1 and 2, and the pinion gear 6. Thus, washers having intermittent increased-diameter portions, such as in FIGS. 10 and 11, are the preferred embodiment for thrust washers for use in the pinion gear carriage of the present invention.

It will be understood by those skilled in the art that the foregoing description is in terms of preferred embodiment of the present invention wherein various changes and modifications may be made without departing from the spirit and scope of the invention, as is set forth in the appended claims.

What is claimed is:

1. A pinion gear carriage for a planetary gear mechanism having a rotatable central sun gear rotating differentially with respect to a central shaft and having a lubricant orifice said pinion gear carriage comprising:
   (a) a first annular member having a central portion for engaging the central shaft;
   (b) a second annular member secured to said first annular member to define therewith a carriage frame and having a central aperture for receiving said central shaft and said sun gear, an edge of the second annular member being positioned adjacent the central aperture to form a lubrication conduit for channeling lubricant flowing through said lubricant orifice;
   (c) said carriage frame having at least one hole through which a pinion gear shaft is adapted to be disposed;
   (d) a bearing adapted to be disposed between the pinion gear shaft and an associated pinion gear for allowing low-friction rotation of the pinion gear about the pinion gear shaft; and
   (e) two sets of thrust washers disposed on said pinion gear shaft, one of said sets being disposed adjacent said first annular member and another of said sets being disposed adjacent said second annular member to limit friction between said annular members and said pinion gear, each of said thrust washers having a central aperture including cutout portions arranged to provide overlap with respect to cutout portions of an adjacent thrust washers regardless of the rotational phase relationship therebetween thereby forming a lubrication passageway through each of said sets of thrust washers, said lubrication passageway communicating with said lubrication conduit to form a continuous passage between said sun gear and said bearing.

2. The pinion gear carriage of claim 1, wherein the cutout portions comprise a plurality of equally spaced cutouts, each of said adjacent thrust washers having a different number of cutouts.

3. The pinion gear carriage of claim 2, wherein one thrust washer of each of said sets has three cutout portions each extending about an arc of approximately 60° and an adjacent washer has four cutout portions each extending along an arc of approximately 40°.

4. The pinion gear of claim 3, wherein each of said sets comprises a pair of thrust washers.

* * * * *